US012625532B2

(12) United States Patent
Ock

(10) Patent No.: US 12,625,532 B2
(45) Date of Patent: May 12, 2026

(54) ELECTRONIC DEVICE FOR PREDICTING CHIP TEMPERATURE AND PERFORMING PRE-OPERATION, AND OPERATION METHOD THEREOF

(71) Applicant: SK hynix Inc., Icheon (KR)

(72) Inventor: Eun Jae Ock, Icheon (KR)

(73) Assignee: SK hynix Inc., Icheon (KR)

( * ) Notice: Subject to any disclaimer, the term of this patent is extended or adjusted under 35 U.S.C. 154(b) by 440 days.

(21) Appl. No.: 18/308,577

(22) Filed: Apr. 27, 2023

(65) Prior Publication Data

US 2024/0160260 A1 May 16, 2024

(30) Foreign Application Priority Data

Nov. 11, 2022 (KR) ........................ 10-2022-0150837

(51) Int. Cl.
*G06F 1/20* (2006.01)
*G06F 11/30* (2006.01)

(52) U.S. Cl.
CPC .......... *G06F 1/206* (2013.01); *G06F 11/3058* (2013.01)

(58) Field of Classification Search
CPC ........ G06F 1/206; G06F 11/3058; G06F 1/20; G06F 1/3215; G06F 1/324; G06F 1/3296; G06F 3/0658; G06F 3/0604; G06F 3/0614; G06F 3/0653; G06F 2212/1016; G06F 2212/1032; G06N 3/08; G06N 3/02
USPC ........................................................ 700/300
See application file for complete search history.

(56) References Cited

U.S. PATENT DOCUMENTS

| | | | | |
|---|---|---|---|---|
| 2002/0169924 A1* | 11/2002 | Osborn | .................. | G06F 1/206 |
| | | | | 711/106 |
| 2006/0004537 A1* | 1/2006 | Jain | ......................... | G01K 7/42 |
| | | | | 374/E7.042 |
| 2015/0000889 A1* | 1/2015 | Bellamkonda | .......... | G01K 7/42 |
| | | | | 165/287 |
| 2015/0286262 A1* | 10/2015 | Park | .................. | G05D 23/1917 |
| | | | | 713/320 |
| 2016/0266628 A1 | 9/2016 | Jain et al. | | |
| 2017/0344100 A1* | 11/2017 | Shi | ......................... | G06F 1/206 |
| 2018/0082631 A1* | 3/2018 | Chang | .................. | G09G 3/3648 |
| 2019/0265764 A1* | 8/2019 | Ping | ..................... | G05B 13/026 |
| 2019/0370066 A1* | 12/2019 | Ma | ............................ | G06F 9/50 |
| 2020/0073726 A1 | 3/2020 | Lee et al. | | |
| 2021/0240156 A1* | 8/2021 | Jhawar | ..................... | G06N 3/08 |
| 2023/0189470 A1* | 6/2023 | Bang | ..................... | G05D 23/20 |
| | | | | 700/300 |

FOREIGN PATENT DOCUMENTS

| | | |
|---|---|---|
| KR | 10-2007-0039035 A | 4/2007 |
| KR | 10-2018-0003576 A | 1/2018 |
| KR | 10-2019-0090356 A | 8/2019 |

* cited by examiner

*Primary Examiner* — Chun Cao

(57) ABSTRACT

A method for operating an electronic device includes predicting a temperature rise of the electronic device when the application is started, predicting a temperature of the electronic device based on the predicted temperature rise and a current temperature of the electronic device, and lowering the temperature of the electronic device when the predicted temperature of the electronic device is higher than a preset threshold temperature.

19 Claims, 3 Drawing Sheets

ELECTRONIC DEVICE FOR PREDICTING CHIP TEMPERATURE AND PERFORMING PRE-OPERATION, AND OPERATION METHOD THEREOF

CROSS REFERENCE TO RELATED APPLICATION

The present application claims the benefit 35 U.S.C. 119(a) of Korea Patent Application No. 10-2022-0150837, filed Nov. 11, 2022, the contents of which is incorporated herein for all purposes by reference in its entirety.

FIELD

Various embodiments relate to an electronic device which predicts a temperature of a chip according to execution of an application (e.g., application program) and performs a pre-operation to substantially prevent an excessive increase in temperature of the chip, and an operation method of the electronic device.

BACKGROUND

A storage device is a device capable of storing data at a request from an external device such as a computer, a mobile terminal such as a smart phone or tablet, or various electronic devices.

The storage device may include a memory and a memory controller for controlling the memory. The memory controller may receive a command from the external device and perform or control operations for reading data from the memory, writing/programming data in the memory, or erasing data from the memory based on the received command.

Some memory devices may require a higher level of reliability than general-purpose products. In particular, these memory devices are desirable to ensure operation at a higher temperature than general-purpose products. When the memory devices operate at a high temperature, a policy such as clock frequency reduction may be performed to lower a product temperature, but the policy may be performed in a situation such as sudden power off (SPO), resulting in undesirable problems in terms of device operation.

SUMMARY

In order to solve the above problem, it is necessary to predict in advance when and how much the temperature of a device is to rise.

Various embodiments of the present disclosure may provide a method of predicting in advance how much the temperature of a device is to rise based on artificial intelligence using supervised learning based on machine learning.

The technical tasks to be achieved in the present disclosure are not limited to the technical tasks mentioned above, and other technical tasks not mentioned can be clearly understood by those of ordinary skill in the art to which the present disclosure belongs from the description below.

According to various embodiments of the present disclosure, a method for operating an electronic device may include predicting a temperature rise of the electronic device when an application is started, the temperature rise being associated with executing the application, predicting a temperature of the electronic device based on the predicted temperature rise and a current temperature of the electronic device and lowering the temperature of the electronic device when the predicted temperature of the electronic device is higher than a preset threshold temperature.

According to various embodiments of the present disclosure, the predicting of the temperature rise of the electronic device may include predicting the temperature rise of the electronic device caused by the application based on a trained artificial neural network.

According to various embodiments of the present disclosure, the predicting of the temperature rise of the electronic device based on the trained artificial neural network may include obtaining data sets, each of the data sets including a plurality of input parameters that include a measured temperature rise during a period in which the application is executed and the current temperature of the electronic device when the application is started, determining whether each of the plurality of input parameters has a correlation with the measured temperature rise, selecting one or more input parameters each determined to have the correlation with the measured temperature rise among the plurality of input parameters as each of input data sets, training the artificial neural network through supervised learning based on the input data sets each including the selected input parameters and the measured temperature rise, testing performance of the trained artificial neural network and finishing training of the artificial neural network when the performance of the trained artificial neural network is greater than or equal to a first threshold.

According to various embodiments of the present disclosure, the plurality of input parameters may further include a remaining battery level, a current time, a memory used by applications running in background, a usage time of the application, and whether or not charging is being performed.

According to various embodiments of the present disclosure, the obtaining of the data of may include obtaining more than a preset number of data sets, the preset number being sufficiently great to ensure normality of data.

According to various embodiments of the present disclosure, the selecting of input parameters may include obtaining a correlation coefficient by performing a linear regression analysis on each of the plurality of input parameters and the temperature rise, determining that one or more input parameters each having the correlation coefficient greater than a threshold value have the correlation with the measured temperature rise and selecting the input parameters determined as each having the correlation with the measured temperature rise to generate the input data sets of the artificial neural network According to various embodiments of the present disclosure, the training of the artificial neural network may include training the artificial neural network using a portion of the input data sets, and the testing of the performance of the trained artificial neural network may include testing the performance of the trained artificial neural network using a remaining portion of the input data sets.

According to various embodiments of the present disclosure, the obtaining of the data sets, the determining of whether each of the plurality of input parameters has the correlation with the measured temperature rise, the selecting of the input parameters, and the training of the artificial neural network are repeatedly performed when the performance of the trained artificial neural network is less than the first threshold.

According to various embodiments of the present disclosure, the method may further include determining whether a number of repetitions of the training of the artificial neural network is greater than a second threshold and finishing the training of the artificial neural network is equal to or greater than the preset second threshold and the performance of the trained artificial neural network is greater than or equal to a preset third threshold.

According to various embodiments of the present disclosure, the method may further include discarding the artificial neural network for the application, when the number of repetitions of training of the artificial neural network is equal to or greater than the preset second threshold and the performance of the trained artificial neural network is less than the third threshold.

According to various embodiments of the present disclosure, the lowering of the temperature of the electronic device may include reducing an operating frequency of a processor that controls the electronic device or reducing an operating frequency of a memory included in the electronic device or both.

According to various embodiments of the present disclosure, a memory controller may include a first interface configured to perform data communication with a first device, a second interface configured to generate a signal for controlling an operation of a second device, a temperature predictor configured to predict a temperature rise of an electronic device based on a trained artificial neural network when an application is started, the temperature rise being associated with executing the application, generate input data sets for the artificial neural network, and train the artificial neural network and a processor configured to predict a temperature of the electronic device based on the temperature rise predicted by the temperature predictor and a current temperature of the electronic device, and perform an operation for lowering the temperature of the electronic device based on the predicted temperature of the electronic device.

According to various embodiments of the present disclosure, an electronic device may include a temperature predictor configured to predict a temperature rise of the electronic device based on a trained artificial neural network when an application is started, the temperature rise being associated with executing the application, generate input data sets for the artificial neural network, and train the artificial neural network and a processor configured to predict a temperature of the electronic device based on the temperature rise predicted by the temperature predictor and a current temperature of the electronic device, and perform an operation for lowering the temperature of the electronic device based on the predicted temperature of the electronic device.

According to various embodiments of the present disclosure, the temperature predictor is configured to obtain data sets, each of the data sets including a plurality of input parameters that include a measured temperature rise during a period in which the application is executed and the current temperature of the electronic device when the application is started, determine whether each of the plurality of input parameters has a correlation with the measured temperature rise, select one or more input parameters each determined to have the correlation with the measured temperature rise among the plurality of input parameters as each of the input data sets, train the artificial neural network through supervised learning based on the input data sets each including the selected input parameters and the measured temperature rise, test performance of the trained artificial neural network and finish training of the artificial neural network when the performance of the trained artificial neural network is greater than or equal to a first threshold, and wherein the processor is configured to perform the operation for lowering the temperature of the electronic device when the predicted temperature of the electronic device is higher than a threshold temperature.

According to various embodiments of the present disclosure, the temperature predictor is configured to obtain more than a preset number of the data sets, the preset number being sufficiently great to ensure normality of data. obtain a correlation coefficient by performing a linear regression analysis on each of the plurality of input parameters and the measured temperature rise, determine that one or more input parameters each having the correlation coefficient greater than a threshold value have the correlation with the temperature rise, select the input parameters each determined as having the correlation with the measured temperature rise to generate the input data sets of the artificial neural network, train the artificial neural network using a portion of the input data sets and test the performance of the trained artificial neural network using a remaining portion of the input data sets.

According to various embodiments of the present disclosure, the temperature predictor is configured to repeat the obtaining of the data sets, the determining of whether each of the plurality of input parameters has the correlation with the measured temperature rise, the selecting of the input parameters, and the training of the artificial neural network when the performance of the trained artificial neural network is less than the first threshold, finish training of the artificial neural network when a number of repetitions of the training of the artificial neural network is equal to or greater than a second threshold and the performance of the trained artificial neural network is greater than or equal to a third threshold and discard the artificial neural network for the application, when the number of repetitions of the training of the artificial neural network is equal to or greater than the second threshold and the performance of the trained artificial neural network is less than the third threshold.

According to various embodiments of the present disclosure, the processor may reduce the temperature of the electronic device by reducing an operating frequency of the processor, reducing an operating frequency of the second external device, or reducing a number of dies activated in the second external device.

BRIEF DESCRIPTION OF THE DRAWINGS

FIG. 1 is a diagram schematically illustrating a configuration of a storage device according to embodiments of the present disclosure.

FIG. 2 is a diagram illustrating a configuration of a temperature predicting unit additionally provided in a controller according to various embodiments of the present disclosure.

DETAILED DESCRIPTION

Figure 3:
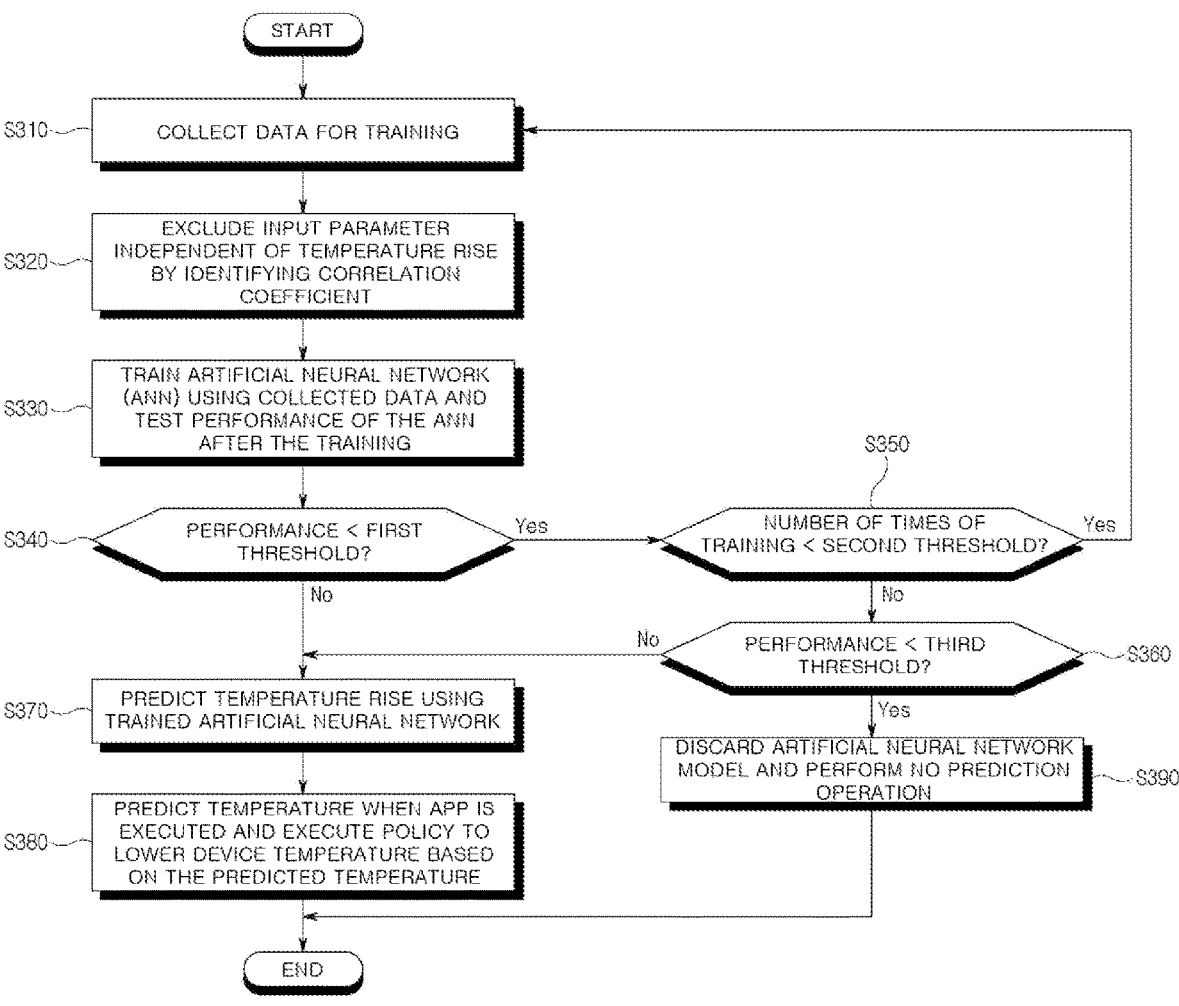
FIG. 3 is a flowchart for describing operation of the temperature predicting unit.

Hereinafter, embodiments of the present disclosure will be described in detail with reference to the accompanying drawings.

Figure 1:
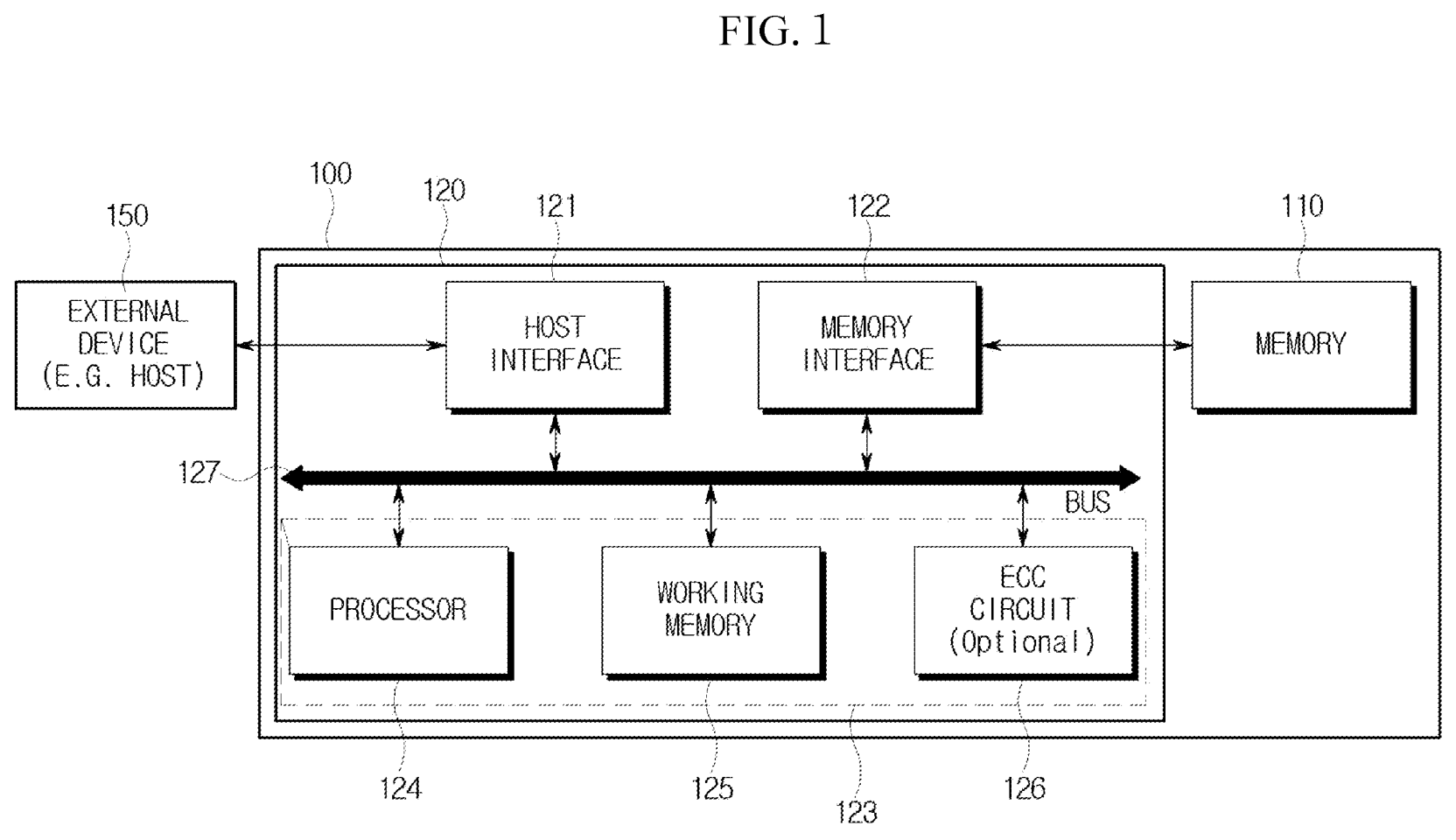

FIG. 1 is a diagram schematically illustrating a configuration of a storage device 100 according to embodiments of the present disclosure.

Referring to FIG. 1, a storage device 100 according to embodiments of the present disclosure may include a memory 110 that stores data and a controller 120 that controls the memory 110. When desirable, additional components may be further included in the storage device 100.

The memory 110 in FIG. 1 includes a plurality of memory blocks and operates in response to control of the controller 120. Here, the operation of the memory 110 may include, for example, a read operation, a program operation (also referred to as "write operation"), and an erase operation.

For example, the memory 110 may include various types of non-volatile memories, such as NAND flash memory, 3D NAND flash memory, NOR flash memory, resistive random access memory (RRAM), Phase-Change Memory (PRAM), Magnetoresistive Random Access Memory (MRAM), Ferroelectric Random Access Memory (FRAM), or Spin Transfer Torque Random Access Memory (STT-RAM) and the like.

Meanwhile, the memory 110 may be implemented as a three-dimensional array structure. Embodiments of the present disclosure may be applied not only to a flash memory in which a charge storage layer is made of a conductive floating gate, but also to a charge trap flash (CTF) memory in which a charge storage layer is made of an insulating film.

The memory 110 may receive a command, an address or the like from the controller 120 (also referred to as a memory controller), and access a region of a memory cell array selected by the address. That is, the memory 110 may perform an operation indicated by a command on the region selected by the address.

For example, the memory 110 may perform a program operation, a read operation, an erase operation, or the like. During a program operation, the memory 110 may program data in the region selected by the address. During a read operation, the memory 110 may read data from the region selected by the address. During an erase operation, the memory 110 may erase data stored in the region selected by the address.

The controller 120 may control program (write), read, erase, and background operations with respect to the memory 110. Here, the background operation may include one or more of Garbage Collection (GC), Wear Leveling (WL), Read Reclaim (RR), or Bad Block Management (BBM) operations.

The controller 120 may control an operation of the memory 110 according to a request from an external device (e.g., a host) located outside the storage device 100. On the other hand, the controller 120 may control an operation of the memory 110 regardless of a request from an external device.

The external device 150 may include a computer, a UMPC (Ultra Mobile PC), a workstation, a PDA (Personal Digital Assistant), a tablet, a mobile phone, a smart phone, an e-book, a PMP (portable multimedia player), a portable game machine, a navigation device, a black box, a digital camera, a DMB (Digital Multimedia Broadcasting) player, a smart television, a digital audio recorder, a digital audio player, a digital picture recorder, a digital picture player, a digital video recorder, a digital video player, a storage constituting a data center, one of various electronic devices constituting a home network, one of various electronic devices constituting a computer network, one of various electronic devices constituting a telematics network, a radio frequency identification (RFID) device, a mobility device (e.g., vehicle, robot, drone) that travels on the ground, water, or air under human control or autonomously travels, and the like.

The external device 150 may include at least one operating system (OS). The operating system may generally manage and control functions and operations of the external device 150, and provide mutual operation between the external device 150 and the storage device 100. The operating system may be classified into a general operating system and a mobile operating system according to the mobility of an external device.

Meanwhile, the controller 120 and the external device 150 may be separate devices. In some cases, the controller 120 and the external device (not shown) may be implemented as an integrated device. Hereinafter, for convenience of description, a description will be given by taking, as an example, a case in which the controller 120 and an external device 150 are separate devices will be described.

Referring to FIG. 1, the controller 120 may include a host interface 121, a memory interface 122, and a control circuit 123.

The host interface 121 may provide an interface for communication with an external device 150. For example, the host interface 121 may include an interface using one or more of various interface protocols such as a universal serial bus (USB) protocol, a multimedia card (MMC) protocol, a peripheral component interconnection (PCI) protocol, a PCI-express (PCI-E) protocol, an advanced technology attachment (ATA) protocol, a serial-ATA protocol, a parallel-ATA protocol, an SCSI (small computer small interface) protocol, an enhanced small disk interface (ESDI) protocol, an integrated drive electronics (IDE) protocol, a proprietary protocol, and the like.

The control circuit 123 may receive a command through the host interface 121 and perform an operation for processing the received command.

The memory interface 122 may be connected to the memory 110 to provide an interface for communication with the memory 110. That is, the memory interface 122 may be configured to provide an interface between the memory 110 and the controller 120 in response to control by the control circuit 123.

The control circuit 123 may control the operation of the memory 110 by performing overall control operations of the controller 120. To this end, according to an embodiment, the control circuit 123 may include a processor 124, a working memory 125, and/or an error detection and correction circuit (ECC Circuit) 126 optionally.

The processor 124 may control overall operation of the controller 120.

The processor 124 may communicate with an external device 150 through the host interface 121 and communicate with the memory 110 through the memory interface 122.

The processor 124 may perform a function of a Flash Translation Layer (FTL). The processor 124 may translate a logical block address provided by an external device 150 into a physical block address through a flash translation layer (FTL). The flash translation layer may receive a logical block address and translate the logical block address into a physical block address using a mapping table.

There are several address mapping methods for the flash translation layer according to mapping units. Representative address mapping methods may include a page mapping method, a block mapping method, and a hybrid mapping method.

The processor 124 may randomize data received from an external device 150. For example, the processor 124 may randomize data received from an external device 150 using a set randomizing seed. The randomized data may be provided to the memory 110 and programmed in the memory 110.

The processor 124 may de-randomize data received from the memory 110 during a read operation. For example, the processor 124 may derandomize data received from the memory 110 using a de-randomizing seed. The de-randomized data may be output to the external device 150.

The processor 124 may perform background functions for the memory 110 such as a garbage collection (GC) function, a wear leveling (WL) function, and a bad block management function.

The garbage collection function may be a function of collecting existing data partially recorded in a memory block and moving the data to another memory block to secure a free space in which data is to be recorded when there is no sufficient space in the memory 110 to record data.

The wear leveling function may be a function of evenly writing data to all memory blocks of the memory 110 to prevent excessive use of a specific block in order to prevent errors and data loss of the memory 110 in advance and improve durability and stability of a product.

The bad block management function may be a function of detecting a bad block in the memory 110 and, when there is a reserved block, preventing data from being written to the bad block by replacing the bad block with the reserved block.

The processor 124 may control the operation of the controller 120 by executing firmware. In other words, the processor 124 may control overall operations of the controller 120 and execute (drive) firmware stored in the working memory 125 during booting. Hereinafter, the operation of the storage device 100 to be described in various embodiments of the present disclosure may be implemented by making the processor 124 execute firmware in which a corresponding operation is defined.

The firmware is a program executed in the storage device 100 to drive the storage device 100 and may include various functional layers. For example, the firmware may include binary data in which codes for executing each of the aforementioned functional layers are defined.

For example, the firmware may include a flash translation layer that performs a translation function between a logical block address for transmission from an external device 150 to the storage device 100 and a physical block address of the memory 110, a host interface layer (HIL) that interprets a command received from an external device 150 through the host interface 121 and transfers the command to a flash translation layer, and a flash Interface layer (FIL) that transfers a command instructed by the flash translation layer to the memory 110.

Also, the firmware may include a garbage collection function, a wear leveling function, and a bad block management function.

The firmware may be loaded into the working memory 125 from, for example, the memory 110 or a separate non-volatile memory (e.g., ROM, NOR Flash) located outside the memory 110. When executing a booting operation after power-on, the processor 124 may first load all or part of the firmware into the working memory 125.

The processor 124 may perform a logic operation defined in firmware loaded into the working memory 125 to control the overall operation of the controller 120. The processor 124 may store a result of performing the logic operation defined in the firmware in the working memory 125. The processor 124 may allow the controller 120 to generate a command or a signal according to the result of performing the logic operation defined in the firmware. When the part of the firmware in which the logical operation to be performed is defined is not loaded into the working memory 125, the processor 124 may generate an event (e.g., interrupt) for loading the corresponding part of the firmware into the working memory 125.

Meanwhile, the processor 124 may load meta data required to drive the firmware from the memory 110. The meta data is data for managing the memory 110 and may include management information about user data stored in the memory 110.

Meanwhile, the firmware may be updated while the storage device 100 is being manufactured or the storage device 100 is running. The controller 120 may download new firmware from the outside of the storage device 100 and update existing firmware to new firmware.

The working memory 125 may store firmware, program codes, commands, or data required to drive the controller 120. The working memory 125 is, for example, a volatile memory, and may include one or more of static RAM (SRAM), dynamic RAM (DRAM), and synchronous DRAM (SDRAM).

An error detection and correction circuit 126 may detect an error bit of target data using an error correction code and correct the detected error bit. Here, the target data may be, for example, data stored in the working memory 125 or data read from the memory 110.

The error detection and correction circuit 126 may be implemented to decode data with an error correction code. The error detection and correction circuit 126 may be implemented with a variety of decoders. For example, a decoder performing non-systematic decoding or a decoder performing systematic decoding may be used.

For example, the error detection and correction circuit 126 may detect an error bit in units of sectors set for each read data. That is, each read data may be composed of a plurality of sectors. A sector may refer to a data unit smaller than a page, which is a read unit of a flash memory. Sectors constituting each read data may be associated with each other through addresses.

The error detection and correction circuit 126 may calculate a bit error rate (BER) and determine whether correction is possible in units of sectors. For example, when the bit error rate (BER) is higher than a set reference value, the error detection and correction circuit 126 may determine that a corresponding sector is uncorrectable or fail. On the other hand, when the bit error rate (BER) is lower than the reference value, the error detection and correction circuit 126 may determine that a corresponding sector is correctable or pass.

The error detection and correction circuit 126 may perform error detection and correction operation on all pieces of read data, sequentially. When a sector included in read data is correctable, the error detection and correction circuit 126 may omit an error detection and correction operation for a corresponding sector of next read data. When the error detection and correction operation has been performed on for all pieces of read data, the error detection and correction circuit 126 may detect sectors finally determined to be uncorrectable. The number of sectors determined to be uncorrectable may be one or more. The error detection and correction circuit 126 may transfer information (e.g., address information) on sectors determined to be uncorrectable to the processor 124.

The bus 127 may be configured to provide a channel between the components 121, 122, 124, 125, and 126 of the controller 120. The bus 127 may include, for example, a control bus for transferring various control signals, commands, and the like and a data bus for transferring a variety of data.

On the other hand, some of the above-described components 121, 122, 124, 125, and 126 of the controller 120 may be deleted, or the above-described components 121, 122, 124, 125, and 126 of the controller 120 may be integrated into a single component. In some cases, one or more other components may be added in addition to the above-described components of the controller 120. According to an embodiment, in the present disclosure, a temperature predicting unit capable of predicting a temperature rise of the device according to the execution of an application may be further added.

Figure 2:
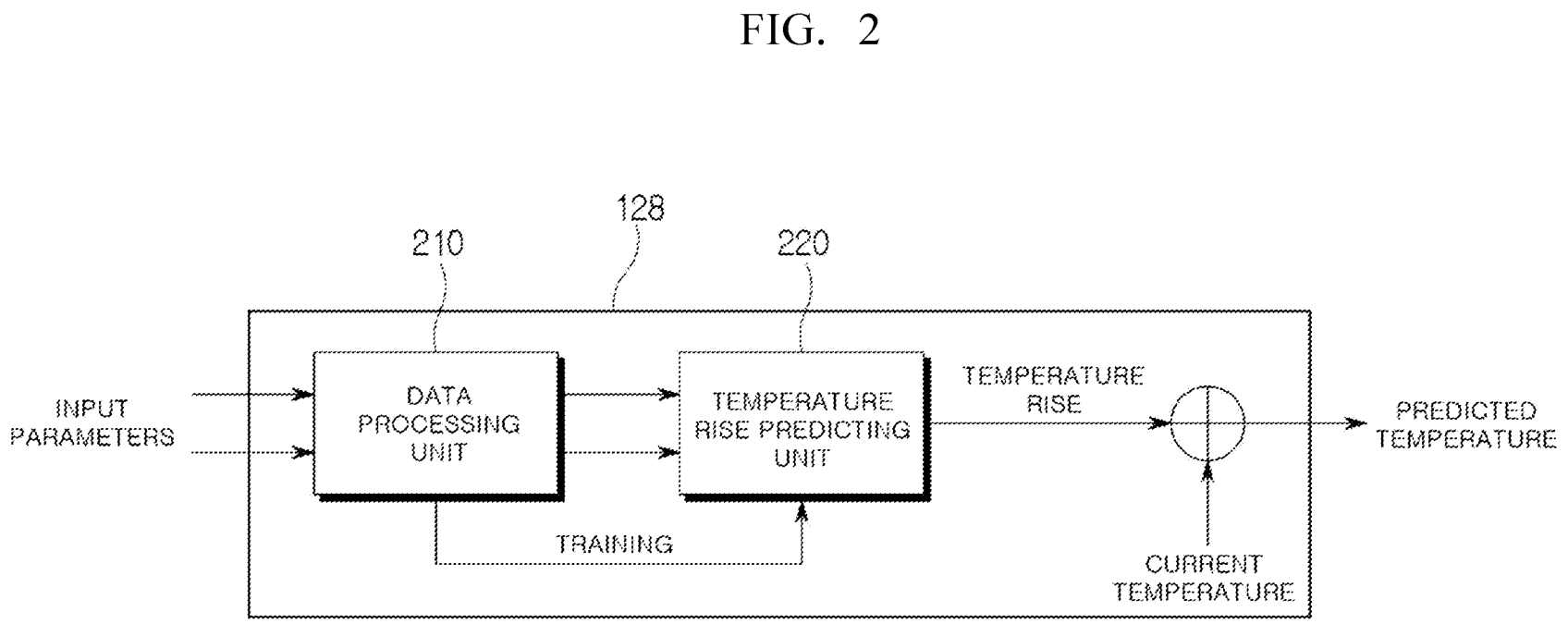

FIG. 2 is a diagram illustrating a configuration of a temperature predicting unit additionally provided in a controller according to various embodiments of the present disclosure.

According to one embodiment, a temperature predictor 128 may be executed by a processor (e.g., the processor 124 in FIG. 1) as a software block. According to another embodiment, the temperature predictor 128 may be provided as a separate core logic or module from the processor 124.

Referring to FIG. 2, the temperature predictor 128 may include a data processing unit 210 and a temperature rise predicting unit 220.

The temperature rise predicting unit 220 may predict how much the temperature will rise when the application is executed based on artificial intelligence.

The artificial intelligence may be a system configured to perform a specific task by training an artificial neural network (ANN) model via machine learning. The artificial neural network is composed of a plurality of layers and may be defined by an activation function that generates a node connection pattern between layers, weight values applied to each connection, and an output value. A fully connected neural network (FCNN) that includes an input layer, an output layer, and one or more hidden layers as an artificial neural network structure, a convolutional neural network (CNN) that is effective in identifying structured spatial data such as images, videos, and strings, or the like may be used, and in addition, a recurrent neural network (RNN), a long short term memory network (LSTM), a gated recurrent unit (GRU), or the like may be used. Detailed descriptions of known aspects of the structure of the artificial neural network in the art may be omitted for the interest of brevity.

The data processing unit 210 may process input parameters received from the outside of the temperature predictor 128 to generate inputs of the temperature rise predicting unit 220.

According to an embodiment, the artificial neural network of the temperature rise predicting unit 220 proposed in the present disclosure is trained using real-time data. According to an embodiment, the data processing unit 210 may process the input parameters received from an operating device, only generate learning data for training the artificial neural network of the temperature rise predicting unit 220, and generate inputs for predicting the temperature rise through the artificial neural network of the temperature rise predicting unit 220.

The input for actual prediction and the input for training may be obtained similarly, for example, through an actual operation of a storage device. It is noted that, since the training data is based on supervised learning, temperature rise data obtained through actual operation may be included as a result.

For example, the input parameters may include a current temperature when the application is started, a remaining battery level when the application is started, a current time at which the application is started, an executed application, an amount of used memory of applications running in the background when the application is started, usage time of the executed application, a value indicating whether charging is in progress when the application is ended, and a measured temperature rise during a period of executing the application. The measured temperature rise may be used to verify an output of the artificial neural network of the temperature rise predicting unit 220 during the training.

According to an embodiment, the above-described input parameters may be acquired from the external device 150 or from one or more sensors provided by the temperature predictor 128 itself.

FIG. 3 is a flowchart illustrating an operation of the temperature predictor 128 in FIG. 2, according to an embodiment.

The operation described in the flowchart of FIG. 3 may be independently performed for each application. Accordingly, a separate artificial neural network may be configured and trained for each application.

Hereinafter, the operation performed for a single application is merely described with reference to FIG. 3, but the same operation may be applied to different applications.

Referring to FIG. 3, the data processing unit 210 of the temperature predictor 128 may collect data for learning in operation S310. According to an embodiment, the data processing unit 210 may collect data for learning every time the application has been ended. For example, the data processing unit 210 may collect data set on the temperature of the device when a specific application is started, the remaining battery level, the time of day, the memory used by applications running in the background, and whether or not charging is being performed whenever the specific application is ended. In addition, the data set may include the usage time of the application and the temperature rise when the application is ended. The data set collected by the data processing unit 210 is not limited to the above-described data, and any measurable parameter that may affect the temperature rise of the device may be used as an input parameter.

The data processing unit 210 may start training when more than a preset number of data sets are obtained to secure normality of data. According to an embodiment, the minimum number of data sets may be sufficiently great (e.g., 30) to secure normality of data. Accordingly, the data processing unit 210 may train an artificial neural network for predicting a temperature rise for a corresponding application when more than 30 input parameter data sets are secured for the application.

When more than 30 data sets are obtained, the data processing unit 210 identifies a correlation coefficient through correlation analysis (e.g., linear regression analysis) between each input parameter and the temperature rise in operation S320, determines that there is no correlation between the temperature rise and an input parameter (e.g., usage time) when the absolute value of the correlation coefficient is less than a preset value (e.g., 0.4), excludes the input parameter determined as not having a correlation, and select input parameters determined to have a correlation with the temperature rise as input parameters for prediction when the absolute value of the correlation coefficient between the temperature rise and each of the input parameters is equal to or greater than the preset value. Specifically, when one or more input parameters are each determined not to have a correlation with the temperature rise, the data processing unit 210 may generate a plurality of input data sets by excluding the one or more input parameters which have no correlation with the temperature rise from the data sets.

According to embodiments of the present disclosure, the input of the artificial neural network is not determined in advance. Instead, parameters, each of which is determined to have a correlation with the temperature rise, are used as inputs (or input parameters of an input data set) to the artificial neural network.

The data processing unit 210, in operation S330, may train the artificial neural network using the input data sets, and test the performance of the trained artificial neural network when the training has been completed. According to an embodiment, the data processing unit 210 may train the artificial neural network using a portion of the input data sets and test the trained artificial neural network using the remaining portion of the input data sets. For example, 75% of the input data sets may be used to train the artificial neural network, and the remaining 25% of the input data sets may be used to test the trained artificial neural network.

In operation S340, the data processing unit 210 may determine that the trained artificial neural network provides desired performance and finish the training, when the performance of the trained artificial neural network is greater than or equal to a first threshold (e.g., a preset threshold) as a result of the test. In operation S370, the temperature rise predicting unit 220 may predict a temperature rise using the trained artificial neural network. In this case, the temperature rise predicting unit 220 may receive an input data set from the data processing unit 210. The data processing unit 210 generates the input data set by excluding the input parameters which have no correlation with the temperature rise from the collected data sets.

When the performance of the trained artificial neural network is less than a preset first threshold as the result of the test in operation S340, the data processing unit 210 may determine whether the number of times of collection of learning data (or the number of times of training the artificial neural network) is less than a second threshold in operation S350. The number of times of training may be limited to a second threshold (e.g., a preset second threshold) because repeating training excessively to obtain an artificial neural network that satisfies the performance may degrade the performance of the device.

The data processing unit 210 may re-collect data for training in operation S310 when the number of times of training is smaller than the preset second threshold (e.g., 10) in operation S350. According to an embodiment, data used in the previous training may be discarded. According to another embodiment, the data used in the previous training and newly-collected data may be used together to perform subsequent training.

The data processing unit 210 may determine whether the performance of the artificial neural network trained in operation S360 is greater than or equal to a third threshold when the number of times of training is equal to or greater than the preset second threshold in operation S350. Here, the third threshold may be smaller than the first threshold. In an embodiment, the third threshold may be not greater than 90% of the first threshold. For example, the first threshold may be 0.9 and the third threshold may be 0.8.

When the final performance of the trained artificial neural network is less than the third threshold in operation S360, the data processing unit 210 may determine that it has failed to secure the trained artificial neural network satisfying desirable performance, and in operation S390, the data processing unit 210 may discard the artificial neural network for a corresponding application without performing an operation of predicting a temperature rise for the corresponding application.

When the final performance of the trained artificial neural network is greater than or equal to the third threshold in operation S360, the data processing unit 210 may determine that the trained artificial neural network satisfying performance has been secured, and in operation S370, the temperature rise predicting unit 220 may predict a temperature rise using the trained artificial neural network. That is, when an external device 150 informs that a specific application is started, the temperature rise predicting unit 220 may predict a temperature rise using the trained artificial neural network for the specific application.

Thereafter, in operation S380, the temperature predictor 128 may add the temperature rise predicted by the temperature rise predicting unit 220 and a current temperature of the device when the application is started, predict a temperature of the device when a corresponding application is executed, and execute a policy to lower a device temperature when the predicted temperature is higher than or equal to a preset temperature.

The policy to lower a device temperature may include one or more of reducing an operating frequency of the processor 124 (e.g., increasing a clock cycle of the processor 124), reducing an operating frequency of the memory 110 (e.g., increasing a clock cycle decreasing a clock frequency) of the memory 110, and decreasing the number of activated dies among a plurality of dies included in the memory 110.

As described above, since the policy can be performed for each application in FIG. 3, it is possible to secure a trained artificial neural network for predicting a temperature increase for each application, predict a device temperature using the trained artificial neural network corresponding to the application when the application is started, and execute a policy for lowering the temperature of the device based on a predicted result.

As described above, it is possible to preemptively lowering the device temperature, thereby preventing the policy from being performed at an unexpected moment such as occurrence of SPO and suppressing unexpected fatal problems in terms of device operation. A trained artificial neural network used in a device and its operation method according to embodiments of the present disclosure can predict a device temperature more accurately when a specific application is started for more timely determining to perform a policy to lower a device temperature based on the predicted device temperature, compared to traditional storage devices and their operation methods. Accordingly, undesirable issues resulting from performing the policy untimely occurred in the traditional storage devices and their operation methods may be substantially prevented in a device and its operation method using a trained artificial neural network according to embodiments of the present disclosure.

In addition, a method for preemptively dealing with an increase in device temperature in a storage device may be applied to various external devices, for example, a mobile device, to predict the temperature rise of the device when the application is started and add the predicted temperature rise to a current temperature of the device, thereby predicting the temperature of the device when the application is executed. In addition, based on the predicted temperature of the device, a preemptive measure to lower the temperature of the device may be performed.

According to various embodiments of the present disclosure, it is possible to predict a temperature rise of a device due to execution of application in advance.

According to various embodiments of the present disclosure, it is possible to prevent the temperature reduction policy from being performed at an unexpected moment during operation by performing the temperature reduction policy in advance when the sum of the current internal temperature of the device and the temperature rise is large enough to require the internal temperature reduction policy.

While embodiments of the present disclosure have been described with reference to the attached drawings, it would be understood by those of ordinary skill in the art that the technical configuration of the present disclosure may be implemented in other detailed forms without changing the technical spirit or the essential features of the present disclosure. Thus, it should be noted that the above-described embodiments are provided as examples and should not be interpreted as limiting. Moreover, the scope of the present disclosure should be defined by the following claims rather than the detailed description provided above. Furthermore, the meanings and scope of the claims and all changes or modified forms derived from their equivalents should be construed as falling within the scope of the present disclosure.

What is claimed is:

1. A method for operating an electronic device, the method comprising:
  predicting a temperature rise of the electronic device based on a trained artificial neural network when an application is started, the temperature rise being associated with executing the application;
  predicting a temperature of the electronic device based on the predicted temperature rise and a current temperature of the electronic device; and
  lowering the temperature of the electronic device when the predicted temperature of the electronic device is higher than a preset threshold temperature,
  wherein the predicting of the temperature rise of the electronic device based on the trained artificial neural network comprises:
  obtaining data sets, each of the data sets including a plurality of input parameters that include a measured temperature rise during a period in which the application is executed and the current temperature of the electronic device when the application is started;
  determining whether each of the plurality of input parameters has a correlation with the measured temperature rise;
  selecting one or more input parameters each determined to have the correlation with the measured temperature rise among the plurality of input parameters as each of input data sets; and
  training the artificial neural network through supervised learning based on the input data sets each including the selected input parameters and the measured temperature rise.

2. The method of claim 1, wherein the predicting of the temperature rise of the electronic device based on the trained artificial neural network further comprises:
  testing performance of the trained artificial neural network; and
  finishing training of the artificial neural network when the performance of the trained artificial neural network is greater than or equal to a first threshold.

3. The method of claim 2, wherein the plurality of input parameters further comprises a remaining battery level, a current time, a memory used by applications running in background, a usage time of the executed application, and whether or not charging is being performed.

4. The method of claim 2, wherein the obtaining of the data sets comprises obtaining more than a preset number of data sets, the preset number being sufficiently great to ensure normality of data.

5. The method of claim 4, wherein the selecting of the input parameters comprises:
  obtaining a correlation coefficient by performing a linear regression analysis on each of the plurality of input parameters and the measured temperature rise;
  determining that one or more input parameters each having the correlation coefficient greater than a threshold value have the correlation with the measured temperature rise; and
  selecting the input parameters determined as each having the correlation with the measured temperature rise to generate the input data sets of the artificial neural network.

6. The method of claim 5, wherein the training of the artificial neural network comprises training the artificial neural network using a portion of the input data sets, and
  wherein the testing of the performance of the trained artificial neural network comprises testing the performance of the trained artificial neural network using a remaining portion of the input data sets.

7. The method of claim 5, wherein the obtaining of the data sets, the determining of whether each of the plurality of input parameters has the correlation with the measured temperature rise, the selecting of the input parameters, and the training of the artificial neural network are repeatedly performed when the performance of the trained artificial neural network is less than the first threshold.

8. The method of claim 7, further comprising:
  determining whether a number of repetitions of the training of the artificial neural network is greater than a second threshold; and
  finishing the training of the artificial neural network when the number of repetitions of the training of the artificial neural network is equal to or greater than the second threshold and the performance of the trained artificial neural network is greater than or equal to a third threshold.

9. The method of claim 8, further comprising:
  discarding the artificial neural network for the application, when the number of repetitions of the training of the artificial neural network is equal to or greater than the second threshold and the performance of the trained artificial neural network is less than the third threshold.

10. The method of claim 2, wherein the lowering of the temperature of the electronic device comprises: reducing an operating frequency of a processor that controls the electronic device, or reducing an operating frequency of a memory included in the electronic device, or both.

11. A memory controller comprising:
  a first interface configured to perform data communication with a first device;
  a second interface configured to generate a signal for controlling an operation of a second device;
  a temperature predictor configured to predict a temperature rise of an electronic device based on a trained artificial neural network when an application is started, the temperature rise being associated with executing the application, generate input data sets for the artificial neural network, and train the artificial neural network; and
  a processor configured to predict a temperature of the electronic device based on the temperature rise predicted by the temperature predictor and a current temperature of the electronic device, and perform an operation for lowering the temperature of the electronic device based on the predicted temperature of the electronic device, wherein the temperature predictor is configured to:

obtain data sets, each of the data sets including a plurality of input parameters that include a measured temperature rise during a period in which the application is executed and the current temperature of the electronic device when the application is started;

determine whether each of the plurality of input parameters has a correlation with the measured temperature rise;

select one or more input parameters each determined to have the correlation with the measured temperature rise among the plurality of input parameters as each of the input data sets; and train the artificial neural network through supervised learning based on the input data sets each including the selected input parameters and the measured temperature rise.

12. The memory controller of claim 11, wherein the temperature predictor is configured to:

test performance of the trained artificial neural network; and finish training of the artificial neural network when the performance of the trained artificial neural network is greater than or equal to a first threshold.

13. The memory controller of claim 12, wherein the temperature predictor is configured to:

obtain more than a preset number of the data sets, the preset number being sufficiently great to ensure normality of data;

obtain a correlation coefficient by performing a linear regression analysis on each of the plurality of input parameters and the measured temperature rise;

determine that one or more input parameters each having the correlation coefficient greater than a threshold value have the correlation with the measured temperature rise;

select the input parameters each determined as having the correlation with the measured temperature rise to generate the input data sets of the artificial neural network;

train the artificial neural network using a portion of the input data sets; and test the performance of the trained artificial neural network using a remaining portion of the input data sets.

14. The memory controller of claim 13, wherein the temperature predictor is configured to:

repeat the obtaining of the data sets, the determining of whether each of the plurality of input parameters has the correlation with the measured temperature rise, the selecting of the input parameters, and the training of the artificial neural network when the performance of the trained artificial neural network is less than the first threshold;

finish the training of the artificial neural network when a number of repetitions of the training of the artificial neural network is equal to or greater than a second threshold, and the performance of the trained artificial neural network is greater than or equal to a third threshold; and discard the artificial neural network for the application, when the number of repetitions of the training of the artificial neural network is equal to or greater than the second threshold and the performance of the trained artificial neural network is less than the third threshold.

15. The memory controller of claim 11, wherein the processor is configured to reduce the temperature of the electronic device when the predicted temperature of the electronic device is higher than a threshold temperature, by performing one or more of reducing an operating frequency of the processor, reducing an operating frequency of the second device, and reducing a number of dies activated in the second device.

16. An electronic device comprising:

a temperature predictor configured to predict a temperature rise of the electronic device based on a trained artificial neural network when an application is started, the temperature rise being associated with executing the application, generate input data sets for the artificial neural network, and train the artificial neural network; and a processor configured to predict a temperature of the electronic device based on the temperature rise predicted by the temperature predictor and a current temperature of the electronic device, and perform an operation for lowering the temperature of the electronic device based on the predicted temperature of the electronic device, wherein the temperature predictor is configured to:

obtain data sets, each of the data sets including a plurality of input parameters that include a measured temperature rise during a period in which the application is executed and the current temperature of the electronic device when the application is started;

determine whether each of the plurality of input parameters has a correlation with the measured temperature rise;

select one or more input parameters each determined to have the correlation with the measured temperature rise among the plurality of input parameters as each of the input data sets; and train the artificial neural network through supervised learning based on the input data sets each including the selected input parameters and the measured temperature rise.

17. The electronic device of claim 16, wherein the temperature predictor is configured to:

test performance of the trained artificial neural network; and finish training of the artificial neural network when the performance of the trained artificial neural network is greater than or equal to a first threshold, and wherein the processor is configured to perform the operation for lowering the temperature of the electronic device when the predicted temperature of the electronic device is higher than a threshold temperature.

18. The electronic device of claim 17, wherein the temperature predictor is configured to:

obtain more than a preset number of the data sets, the preset number being sufficiently great to ensure normality of data;

obtain a correlation coefficient by performing a linear regression analysis on each of the plurality of input parameters and the measured temperature rise;

determine that one or more input parameters each having the correlation coefficient greater than a threshold value have the correlation with the temperature rise;

select the input parameters each determined as having the correlation with the measured temperature rise to generate the input data sets of the artificial neural network;

train the artificial neural network using a portion of the input data sets; and test the performance of the trained artificial neural network using a remaining portion of the input data sets.

19. The electronic device of claim 18, wherein the temperature predictor is configured to:

repeat the obtaining of the data sets, the determining of whether each of the plurality of input parameters has the correlation with the measured temperature rise, the selecting of the input parameters, and the training of the artificial neural network when the performance of the trained artificial neural network is less than the first threshold;

finish training of the artificial neural network when a number of repetitions of the training of the artificial neural network is equal to or greater than a second threshold and the performance of the trained artificial neural network is greater than or equal to a third threshold; and discard the artificial neural network for the application, when the number of repetitions of the training of the artificial neural network is equal to or greater than the second threshold and the performance of the trained artificial neural network is less than the third threshold.

* * * * *